United States Patent [19]

Falender et al.

[11] 4,071,577
[45] Jan. 31, 1978

[54] TOUGHENED MERCAPTOSILOXANE MODIFIED EMULSION POLYMERIZED VINYLIC POLYMERS

[75] Inventors: James R. Falender, Sanford; Claudia M. Mettler; John C. Saam, both of Midland, all of Mich.

[73] Assignee: Dow Corning Corporation, Midland, Mich.

[21] Appl. No.: 679,595

[22] Filed: Apr. 23, 1976

[51] Int. Cl.² ............................................. C08L 83/10
[52] U.S. Cl. ........................... 260/827; 260/29.6 NR; 260/29.7 NR; 260/29.7 RP
[58] Field of Search ....... 260/827, 29.6 NR, 29.7 NR, 260/29.7 RP

[56] References Cited
U.S. PATENT DOCUMENTS

| | | | |
|---|---|---|---|
| 2,965,593 | 12/1960 | Dietz | 260/29.6 NR |
| 3,382,196 | 5/1968 | Gowdy et al. | 260/827 |
| 3,445,415 | 5/1969 | Cekada, Jr. et al. | 260/29.6 NR |
| 3,532,729 | 10/1970 | Cekada, Jr. et al. | 260/827 |
| 3,898,300 | 8/1975 | Hilliard | 260/827 |

*Primary Examiner*—Hosea E. Taylor
*Assistant Examiner*—N. Harkaway
*Attorney, Agent, or Firm*—Robert F. Fleming, Jr.

[57] ABSTRACT

The impact strength of certain thermoplastic vinylic polymers is improved by polymerizing the corresponding monomers in an emulsion of a diorganosiloxane containing units of the formula $HSR'SiR_nO_{3-n/2}$. For example a styrene acrylonitrile copolymer containing 20 percent by weight of a dimethylsiloxane-3-mercaptopropylsiloxane copolymer having 1 mol percent mercaptosiloxane has an Izod notched impact strength of 10.8 foot pounds per inch.

7 Claims, No Drawings

TOUGHENED MERCAPTOSILOXANE MODIFIED EMULSION POLYMERIZED VINYLIC POLYMERS

BACKGROUND OF THE INVENTION

It is known that the impact strength of various vinylic thermoplastic polymers can be improved by incorporating therein organopolysiloxanes containing alkenyl substituents. This invention concerns a method of further improving the impact strength of vinylic polymers by employing mercaptosiloxanes in lieu of the vinyl-containing siloxanes.

U.S. Pat. No. 3,898,300 shows improving the impact strength of various styrenic copolymers by polymerizing the monomers in an emulsion of a vinylsiloxane-dimethylsiloxane copolymer. Impact strengths of from 0.4 to 7 foot pounds notched Izod were obtained depending upon the amount of siloxane relative to the vinylic polymer and to the amount of vinyl siloxane in the siloxane copolymer. The patent shows that the optimum of about 7 foot pounds is obtained at 20 percent siloxane and the impact strength decreases with additional siloxane to a value of 2.1 foot pounds at 49 percent siloxane (Example 3, C and D). The patent further teaches that optionally $RSiO_{3/2}$ and $SiO_2$ units can be present in the siloxane copolymer in amounts up to 12 and 5 mol percent respectively (column 4, line 55). The patent further teaches in column 5, line 1, that other monovalent radicals may be present and that "some monovalent radicals may even be helpful to polymerization, such as mercaptoalkyl radicals." These can be present in amount of "1 to 2 percent or less." However, there is no suggestion in the patent that mercaptoalkylsiloxane could be used in the place of vinyl or allyl siloxanes nor is there any suggestion that the use of mercaptoalkylsiloxane would improve the impact strength or any other specific property.

U.S. Pat. No. 3,532,729 teaches modifying mercaptoalkylsiloxanes by grafting thereon various olefins, such grafting being carried out in an emulsion of the siloxane. Since this patent is concerned with modifying siloxanes rather than the modification of thermoplastic vinylic polymers, the amount of siloxane disclosed is 50 percent by weight or more with relation to the polymeric vinylic compounds (Examples 2-6). Also, this patent does not show an appreciation of the fact that the amount of crosslinking siloxane, i.e. $R''SiO_{3/2}$ or $SiO_2$ must be limited in order to obtain improved impact strength.

U.S. Pat. Nos. 3,923,923 and 3,879,491 both relate to improving the impact strength of vinylic polymers, but these patents relate to the bulk polymerization of the vinylic monomers with vinyl-containing siloxanes. Although the former shows that some mercaptoalkylsiloxane can be present, neither of these patents suggests the elimination of the vinyl nor the fact that the inclusion of mercaptoalkylsiloxane would improve the impact strength over that which can be obtained by vinyl.

The copending application of James R. Falender and John C. Saam Ser. No. 679,621 entitled "Toughened Mercaptosiloxane Modified Bulk Polymerized Vinylic Polymers" filed concurrently herewith deals with the preparation of improved impact strength vinylic polymers employing bulk or suspension polymerization methods using mercaptosiloxanes. The distinction between that application and the instant one is the fact that this application relates strictly to the preparation of high impact vinylic polymers employing emulsion polymerization techniques.

It is the object of this invention to prepare improved vinylic polymers particularly with respect to impact strength. The vinylic polymers prepared by the process of this invention show less bubbling and less discoloration at elevated temperatures than those prepared using vinylsiloxanes.

DETAILED DESCRIPTION OF THE INVENTION

This invention relates to a method of improving the impact strength of thermoplastic vinylic polymers which comprises polymerizing (1) a vinylic monomer of the group styrenic monomers, methyl methacrylate, mixtures of major amounts of styrenic monomers and minor amounts of acrylic monomers, alpha-methylstyrene, vinyl halide monomers, vinyl acetate, butadiene monomers and acrylonitrile monomers and mixtures of major amounts of methyl methacrylate and minor amounts of other acrylic monomers, styrenic monomers, butadiene monomers, vinyl halide monomers, vinyl acetate, alpha-methylstyrene, and acrylonitrile monomers, in (2) an emulsion of a copolymer of dimethylsiloxane, from 0.3 to 10 mol percent mercaptosiloxane of the unit formula $HSR'SiR_nO_{3-n/2}$ in which R' is a divalent or trivalent saturated aliphatic hydrocarbon radical of 1 to 18 carbon atoms, two valences of R' being attached to the same silicon atom when R' is trivalent, R is a monovalent hydrocarbon radical free of aliphatic unsaturation of 1 to 6 carbon atoms and n is 0 to 2, and sufficient $R''SiO_{3/2}$ or $SiO_2$ units to give a percent volume swell of the copolymer of from 500 to 1,600 percent in benzene, R'' being of the group HSR'- and R groups, in the presence of a free radical generator whereby a thermoplastic matrix having dispersed therein particles of (2) is obtained, the proportions of (1) and (2) being from 1 to 40 percent by weight (2) based on the combined weights of (1) and (2).

The thermoplastic vinylic matrix can be a homopolymeric styrenic material derived from a styrenic monomer such as styrene, alkyl substituted ring styrenes such as vinyl toluene, ethyl styrene or butyl styrene and chlorine ring substituted styrene such as monochlorostyrene or dichlorostyrene. The vinylic matrix can also be a copolymer of any of these styrenic monomers. In addition, the matrix can be homopolymeric methyl methacrylate. Furthermore, the thermoplastic matrix can be composed of copolymers of a major amount; that is, 50 or more percent by weight of a styrenic monomer and a minor amount; that is, less than 50 percent by weight of other vinylic monomers such as acrylic monomers of the formula $CH_2=CYCOOA$ in which Y is hydrogen or methyl and A is hydrogen or an alkyl radical of 1 to 8 carbon atoms such as methyl methacrylate, ethyl acrylate, butyl acrylate, ethyl methacrylate, hexyl acrylate, acrylic acid or methacrylic acid; alpha-methylstyrene; vinyl halide monomers of the formula $CH_2=CX_aH_{2-a}$ in which $a$ is 1 or 2 and X is chlorine or fluorine, such as vinyl chloride, vinylidene chloride or vinyl fluoride; butadiene monomers such as butadiene, isoprene or chloroprene; acrylonitrile monomers such as acrylonitrile or methacrylonitrile; and vinyl acetate. The thermoplastic matrix can also be a copolymer of a major amount of methyl methacrylate and a minor amount of the above-identified monomers. It should be understood that any of the copolymers can contain more than 2 comonomers.

The emulsions of the organopolysiloxanes employed herein are those prepared by emulsion polymerization of the various organosiloxane ingredients. For the purpose of this invention, the organopolysiloxane is a gelled polymer consisting essentially of dimethylsiloxane and containing from 0.3 to 10 mole percent of mercaptosiloxane of the unit formula $HSR'SiR_nO_{3-n/2}$ in which R' is a divalent aliphatic hydrocarbon radical from 1 to 18 carbon atoms such as methylene, dimethylene, tetramethylene,

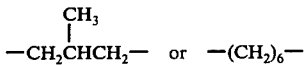

or $-(CH_2)_{18}-$ or R' is a trivalent hydrocarbon radical in which two of the valences are attached to the same silicon atom in which case the mercapto groups have, for example, the structures

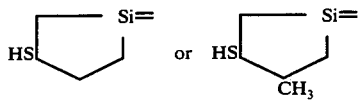

The mercaptosiloxane units can be $HSR'SiO_{3/2}$, $HSR'SiRO$ or $HSR'SiR_2O_{.5}$ in which R is a monovalent hydrocarbon radical such as methyl, ethyl, isopropyl, butyl, hexyl, phenyl or cyclohexyl.

Finally, the copolymer must contain trifunctional or tetrafunctional silicon atoms in order to give the desired volume swell of the polymerized siloxane. These polyfunctional silicon atoms can be in the form of $R''SiO_{3/2}$ units in which R'' can be the HSR' group or any of the R groups shown above or the silicon can be in the form of a tetrafunctional silicon atom, i.e. $SiO_2$. The polyfunctional silicon atoms are best introduced into the polymer by way of alkoxy silanes such as trialkoxysilanes or tetraalkoxysilanes. The amount of the polyfunctional silicon needed to give optimum results varies depending upon whether the silicon is trifunctional or tetrafunctional. However, regardless of the type of polyfunctional silicon employed, the volume swell of the polymer should fall within the range 500 to 1,600 percent and preferably from 800 to 1,300 percent when measured in benzene.

The method of measuring the percent swell is as follows. The emulsion polymer is prepared and the emulsion is broken by coagulation with isopropyl alcohol. The polymer so obtained is washed with water, air dried and then dried in an air circulating oven for one half hour at 150° C. One gram of the polymer is placed in 25 g. of benzene. After one day with agitation the sample is centrifuged and the soluble material decanted from the gel. The gel is weighed, dried at room temperature, then dried in an air oven one half hour at 150° C. and weighed again. The percent volume swell is calculated by the formula $$\frac{\% \text{ Volume Swell}}{100} = \frac{\frac{\text{Swelled Polymer Weight} - \text{Dried Polymer Weight}}{\text{Solvent Density}}}{\frac{\text{Dried Polymer Weight}}{\text{Polymer Density}}}$$

The percent volume swell can be determined in other solvents such as cyclohexane, however, the absolute values vary depending upon the solvent employed so that the values used in this invention were determined in benzene.

The siloxane emulsions employed in this invention can be prepared in any convenient manner. That is, the emulsions can be mechanical emulsions in which the siloxane is first polymerized and then emulsified mechanically or the emulsion can be an emulsion polymer in which low molecular weight siloxanes are first emulsified and then polymerized by emulsion polymerization techniques. Several of these techniques are known in the art and they involve the use of both acid and basic catalysts and anionic, nonionic or cationic emulsifiers.

The best method known to applicants at this time for preparing such emulsions is the technique shown in U.S. Pat. No. 3,294,725 the disclosure of which is incorporated herein by reference. In this patent the principle polymerization catalysts are sulfonic acids of the formula

in which R''' is an aliphatic hydrocarbon radical of at least 6 carbon atoms.

The low molecular weight siloxanes employed can be either cyclic or linear siloxanes. For example, dimethyl cyclic siloxanes or hydroxyl endblocked low molecular weight dimethylpolysiloxanes are emulsified together with the mercaptosiloxane or mercaptosilane and the emulsion polymerization is carried out as shown below. The polyfunctional silicon atoms are best added in the form of alkoxysilanes although other hydrolyzable silanes can also be employed. Often it is best to prereact the alkoxysilane with a low molecular weight hydroxyl dimethylsiloxane in order to make it easier to incorporate the polyfunctional silicon atom into the emulsion polymer. This is particularly true when one is dealing with alkoxy silicates. This prereaction can be carried out by simply heating the alkoxysilane with the hydroxyl dimethylpolysiloxane or if desired, acidic or basic catalysts can be employed to hasten the reaction. It should be understood, of course, that this prereaction is not essential, but generally speaking, superior products are obtained when the alkoxysilane is prereacted with the hydroxyl dimethylpolysiloxane. The prereacted product is then emulsified along with the dimethylpolysiloxane and emulsion polymerized as shown below.

The vinylic monomers either singly or mixtures thereof are emulsion polymerized in the organosiloxane emulsion by standard techniques. All of the ingredients should be in place before the addition of the vinylic monomer. The free radical generator should be added just prior to the addition of the vinylic monomers and these monomers are added slowly with agitation in order to insure proper copolymerization with the siloxane. Temperature is not critical and the optimum varies with the system used. After the addition of the monomers has been complete, the reaction is continued for several hours to insure complete polymerization of the monomer and the resulting graft copolymer is then coagulated by conventional techniques and the resulting powder is washed, dried and milled or mixed at about 180° C. in order to consolidate it. The product is then ready for compression molding or fabrication by other conventional techniques for thermoplastic materials.

The free radical generators employed in this invention can be any of the known free radical generators which will function in emulsion polymerization of vinylic monomers. The term free radical generator includes both chemical generators such as peroxides such as ditertiary butyl perthalate, tertiary butyl percaprylate, tertiary butyl perbenzoate, diacetyl peroxide, acetyl benzoyl peroxide, dipropionyl peroxide, dilauryoyl peroxide, tetralin peroxide, cumene hydroperoxide, tertiary butyl hydroperoxide, or methylcyclohexyl hydroperoxide; alkaline metal and ammonium persulfates, perborates and percarbonates; aliphatic azobisnitriles, such as azobisisobutyronitrile; and non-chemical generators such as heat and high energy ionizing radiation such as ultraviolet light, X-rays and electrons.

The amount of free radical generator employed is not narrowly critical, however, as is generally known one would not want to employ sufficient free radical generator to cause a runaway reaction with the attendant rise in heat and problems associated therewith. Also, care should be taken not to employ large amounts of free radical generator sufficient to destroy the mercaptan group, for example, by oxidizing it to a disulfide rather then causing it to graft to the vinylic polymer. This is more noticeable when the amount of mercaptan in the siloxane is low. For example, in an emulsion polymerization employing 21.5 parts by weight of a dimethylpolysiloxane containing 0.56 mole percent mercaptopropylsiloxane, the use of 0.68 parts by weight of cumene hydroperoxide produced a notched Izod impact of 2.5 foot pounds per inch* in an acrylonitrile-styrene copolymer compared to a blank of 0.33 pounds per inch. The same reaction repeated using only 0.084 parts by weight of the hydroperoxide gave an impact of 10.2 foot pounds per inch. In the same series of experiments however, when the amount of mercaptosiloxane was raised to 2.8 mol percent the difference between 0.68 parts by weight peroxide and 0.084 parts by weight was only that between 10.4 foot pounds per inch and 9.6 foot pounds per inch, respectively.
*Per inch based on thickness of the sample.

The amount of siloxane relative to the vinylic polymer can vary from 1 to 40 weight percent based on the combined weights of (1) and (2). Amounts of siloxane below 1 weight percent have little or no effect on the impact strength of the vinylic polymer and amounts of siloxane above 40 mol percent tend to produce soft materials. However, it is possible to prepare vinylic polymers containing more than 40 weight percent siloxane; that is, up to 60 weight percent, and the resulting emulsions can then be used in the polymerization of additional vinylic monomer so that the weight percent silicone in the finished product falls within the range 1 to 40 weight percent.

The impact strength of the products of this invention are determined by the notched Izod impact test in accordance with ASTM-D-256-56 wherein the notch is 45° and is 0.1 inch deep. The numerical values are in foot pounds per inch thickness of the sample.

As can be seen from the examples infra, optimum conditions to obtain the best impact strengths vary depending upon the mol percent mercaptosiloxane in the siloxane, the type of free radical generator used, the amount of organosiloxane dispersed in the thermoplastic matrix and the particular vinylic monomer being used. Thus, to optimize the impact strength of any particular vinylic thermoplastic a certain amount of tests are needed to select the best concentration of mercaptan in (2), the best free radical generator, and the best amount of siloxane. For example, with polystyrene, the preferred amount of siloxane is from 1 to 5 weight percent while with styrene-acrylonitrile copolymers, the preferred amount of siloxane is from 10 to 30 weight percent both based on the total weight of siloxane and vinylic polymer.

The compositions of this invention can contain other additives normally employed in thermoplastic compositions such as fillers, thermostability additives, ultraviolet stabilizers and the like. In addition to improved impact strength, the compositions of this invention have improved surface lubricity and other properties normally imparted by organosilicon compounds.

The following examples are illustrative only and should not be construed as limiting the invention which is properly delineated in the appended claims.

EXAMPLE 1

The siloxane emulsion polymer employed in this example was made as follows. 47 g. of ethylorthosilicate, 222 g. of a hydroxyl endblocked dimethylpolysiloxane having an average of 6 to 8 siloxane units per molecule and 7.8 g. of dodecyl benzene sulfonic acid were mixed and allowed to react overnight at room temperature. The resulting reaction product is added to 956.7 g. of cyclic dimethylpolysiloxanes and 11.91 g. of cyclic mercaptopropylmethylsiloxane. This mixture is added to 1,800 g. of distilled water and 28.2 g. of dodecyl benzene sulfonic acid and the resulting aqueous emulsion is shaken and given three passes through a homogenizer at 4,500 p.s.i. The preemulsion is heated three hours at 90° C. under a nitrogen purge with vigorous stirring. It is then cooled to room temperature and held there for at least 3 hours. At this time the emulsion is neutralized using a 2 percent by weight sodium hydroxide solution until the pH of the emulsion is 7. Often, it is desirable to use acetic acid to buffer the system. The resulting emulsion is then diluted with 50 percent by weight water and steamed distilled under a nitrogen purge for 4 hours. This reduces the emulsion to its original concentration and the process of steam distillation removes volatile siloxane from the siloxane polymer. A sample of the resulting emulsion was precipitated with isopropanol, dried and dissolved in benzene where it was found to have a gel content of 84 percent and a percent volume swell of 1130.

134 g. of distilled water, 0.0125 g. of $FeSO_4 \cdot 7H_2O$, 88 g. of the above silicone emulsion polymer containing 24.5 percent by weight siloxane, 0.5 g. of $Na_4P_2O_7 \cdot 10H_2O$ and 0.125 g. of alpha-D-glucose were mixed in a reaction vessel and heated at 65° C. with stirring. 0.08125 ml. of cumene hydroperoxide and 0.14 ml. of n-dodecyl mercaptan were added and immediately thereafter a mixture of 60 ml. of styrene and 37 ml. of acrylonitrile free of inhibitors were slowly added over a period of 2 to 3 hours to the reaction vessel. After the addition of the monomers was complete, the reaction was allowed to continue for 6 hours.

The resulting emulsion polymer was coagulated by pouring into hot 2 percent calcium chloride solution, washed with water and dried overnight at 75° in an air circulating oven. The resulting powder was mixed in a Brabender Plasti-Corder with a CAM head supplied by C. W. Brabender Corporation, at 180° C. at 66 r.p.m. for 5 minutes and then is ready for compression molding at 177° C. The molded product had a notched Izod impact of 10.2 foot pounds per inch. The thermoplastic contained 20 percent by weight organopolysiloxane based on the combined weights of the siloxane, styrene and acrylonitrile.

EXAMPLE 2

The procedure of Example 1 was repeated except that the amount of mercaptopropylmethylsiloxane was varied in order to give the mole percent mercaptopropylsiloxane in the finished polymer shown in the table below. The variation of impact strength with mol percent mercaptopropyl is also shown in this table.

| Mole Percent SH Based On Dimethylsiloxane | Impact In Foot Pounds Per Inch | Percent Volume Swell In Benzene |
| --- | --- | --- |
| 0 | 0.42 | 980 |
| 0.0056 | 0.53 | — |
| 0.056 | 2.1 | 1020 |
| 0.280 | 4.8 | 1550 |
| 0.56 | 10.2 | 950 |
| 1.12 | 10.9 | 875 |
| 2.80 | 10.4 | 1130 |

This example shows that in the absence of the mercaptopropylsiloxane no appreciable increase in impact strength of the styrene acrylonitrile is obtained even though the silicone polymer is gelled by the presence of tetrafunctional silicone.

EXAMPLE 3

This example shows the effect of changing the level of crosslinking in the silicone polymer by varying the amount of ethyl silicate employed in the procedure of Example 1. All other conditions are the same. The mol percent mercaptopropylsiloxane is 0.56 mol percent based on the total dimethylpolysiloxane, mercaptopropylmethylsiloxane and ethyl silicate.

| Mole Percent Ethylorthosilicate | Percent Swell of Silicone In In Benzene | Izod Impact In Foot Pounds Per Inch |
| --- | --- | --- |
| 0 | infinite | 0.42 |
| 0.15 | 1500 | 5.5 |
| 0.30 | 1190 | 6.0 |
| 0.44 | 1120 | 6.3 |
| 0.52 | 950 | 10.4 |
| 0.90 | 750 | 5.2 |
| 2.80 | 800 | 4.4 |

This example shows that no appreciable improvement in impact is obtained in the absence of the polyfunctional silicon.

EXAMPLE 4

This example shows the use of mercaptopropyltrimethoxysilane in lieu of the mercaptopropylmethylsiloxane cyclic and the ethyl silicate of Example 1. The process of Example 1 was repeated using mercaptopropyltrimethoxysilane and varying the mole percent of mercaptopropyl and also varying the ratio of mercaptopropyl to hydroxyl endblocked fluid with which it was prereacted prior to the emulsion polymerization as in Example 1. The results are shown in the table below.

| Mole Percent SH | Mole Ratio of Hydroxy Fluid to Mercaptopropyltrimethoxy Expressed As Ratio of SiOH to SiOMe | Izod Impact In Foot Pounds Per Inch | Percent Swell Volume In Benzene |
| --- | --- | --- | --- |
| 0.56 | 1 | 4.0 | 1350 |
| 1.00 | 1 | 9.0 | 1380 |
| 5.00 | 1 | 8.4 | 600 |
| 1.00 | 0.5 | 10.8 | 990 |

EXAMPLE 5

The procedure of Example 1 was repeated except that 10 percent by weight organopolysiloxane based on the weight of the styrene-acrylonitrile was employed. The percent volume swell of the silicone gel in benzene was 1130 and the impact strength was 5.7 foot pounds per inch.

EXAMPLE 6

This example shows the effect of varying the amount of peroxide in relation to the amount of mercaptan groups in the polysiloxane. All the materials were prepared by the method described in Example 1. The results are shown in the table below.

| Amount Cumene Hydroperoxide in ml. | Mole Percent SH | Izod Impact In Foot Pounds Per Inch | Percent Swell Volume in Benzene |
| --- | --- | --- | --- |
| 0.65 | 0 | 0.33 | 980 |
| 0.65 | 0.0056 | 0.72 | — |
| 0.65 | 0.56 | 2.5 | 950 |
| 0.65 | 2.80 | 10.4 | 1130 |
| 0.08 | 0 | 0.42 | 980 |
| 0.08 | 0.0056 | 0.53 | — |
| 0.08 | 0.56 | 10.2 | 950 |
| 0.08 | 2.80 | 9.6 | 980 |

EXAMPLE 7

This example shows the use of azobisisobutyronitrile as a free radical generator. A siloxane emulsion was prepared in accordance with the procedure of Example 4 employing mercaptopropyltrimethoxysilane in amount to give 1 mol percent mercaptopropylsiloxane in the dimethylpolysiloxane emulsion.

151.5 g. of water, 70 g. of a 30.9 percent by weight emulsion of a copolymer of dimethylsiloxane containing 1 mol percent mercaptopropylsiloxane added in the form of mercaptopropyltrimethoxysilane, 0.54 g. of $Na_4P_2O_7 \cdot 10H_2O$ were mixed and heated to 75° C. and then 0.15 ml. of n-dodecyl mercaptan was added. The emulsion was stirred as a mixture of 60 ml. of styrene and 30 ml. of acrylonitrile having dissolved therein 0.68 g. of azobisisobutyronitrile was added slowly over a period of 3 hours. The stirring at 75° C. was continued overnight. The polymer was then broken and the resulting product was molded and found to have an Izod impact strength of 9.3 foot pounds per inch. The percent volume swell in benzene of the silicone gel was 1380.

EXAMPLE 8

This example shows the use of a dimethylpolysiloxane hydrolyzate instead of the pure dimethylpolysiloxane cyclics used in Example 1. 1191 g. of the hydrolyzate of dimethyldichlorosilane which is a mixture of linear hydroxyl endblocked polysiloxanes and cyclic polysiloxanes was mixed with 36 g. of dodecyl benzene sulfonic acid and 1,800 g. of water. This mixture was heated to 90° C. and 31.5 g. of mercaptopropyltrimethoxysilane was added. The emulsion was held at 90° C. for 3 hours and was then neutralized with 2 percent sodium hydroxide solution and diluted with 50 percent by weight water and steamed distilled to its original volume. The resulting gel polymer had a percent swell in benzene of 1380.

158 g. of water, 0.015 g. of $FeSO_4 \cdot 7H_2O$, 63.5 g. of the above emulsion, 0.45 g. of $Na_4P_2O_7 \cdot 10H_2O$ and 0.15 g. of alpha-D-glucose were mixed and heated to 65° C. and 0.08125 ml. of cumene hydroperoxide and 0.14 ml. of n-dodecyl mercaptan were added. Stirring was continued at 65° C. as a mixture of 60 ml. of styrene and 37 ml. of acrylonitrile was added over a period of 6 hours. The reaction was continued for 6 hours after all of the styrene and acrylonitrile had been added. The emulsion was broken and the product molded in the usual manner and the resulting product had an impact strength of 8.3 foot pounds per inch.

EXAMPLE 9

This example shows the effect of prereacting the mercaptopropyltrimethoxysilane with low molecular weight hydroxyl dimethylsiloxane and not prereacting these ingredients before adding the mercaptopropyltrimethoxysilane to the emulsion polymer. The procedure of Example 4 was repeated except that in the second case the mercaptopropyltrimethoxysilane was added directly to the emulsion of the dimethylpolysiloxane cyclics without prereacting with the low molecular weight hydroxyl endblocked dimethylpolysiloxane. The results are shown in the table below.

| Mercaptopropyltrimethoxy-Silane Reacted With Hydroxyl Siloxane | Izod Impact In Foot Pounds Per Inch | Percent Swell In Benzene |
| --- | --- | --- |
| yes | 10.8 | 990 |
| no | 6.0 | 1000 |

EXAMPLE 10

This example shows toughening of polymethylmethacrylate in accordance with the procedure of this invention. The organopolysiloxane emulsion was prepared by the procedure of Example 4 employing mercaptopropyltrimethoxysilane in various amounts as the source of the mercaptoalkylsiloxane. The resulting emulsion was employed as follows. 181 g. of water, 78.5 g. of the above emulsion containing 30 percent by weight siloxane, 0.585 g. of $Na_4P_2O_7 \cdot 10H_2O$ was mixed and heated at 75° C. and stirred as 0.151 ml. of n-dodecyl mercaptan was added. 1.36 g. of azobisisobutyronitrile was dissolved in 100 ml. of methyl methacrylate and the mixture was added to the stirred, heated emulsion over a period of one hour. The reaction was then left at 75° C. overnight. After polymerization, the plastic was coagulated by adding to 2 percent calcium chloride solution and the resulting coagulant containing 20 percent by weight siloxane, was washed, dried and mixed on a Brabender and compression molded. The results are shown in the table below.

| Mole Percent Mercaptopropyltrimethoxysilane | Izod Impact In Foot Pounds Per Inch | Percent Volume Swell In Benzene |
| --- | --- | --- |
| 1 | 1.5 | 1380 |
| 5 | 1.3 | 600 |
| control | 0.38 | — |
| control - 4% vinyl siloxane in the siloxane | 0.81 | — |

From the above data it can be seen that the use of 20 percent by weight of vinylsiloxane in the place of mercaptopropylsiloxane resulted in a far inferior product.

EXAMPLE 11

This example shows the use of polystyrene as the vinylic monomer.

Mercaptopropyltrimethoxysilane was reacted with a linear hydroxyl endblocked dimethylpolysiloxane having an average of 30 dimethylsiloxane units per molecule by heating the mixture of the two with potassium hydroxide catalysts in the ratio of 1 potassium per 5000 silicon atoms at 100 mm. pressure for 2 hours at 50°-70° C. The resulting material was neutralized with carbon dioxide and devolatilized under vacuum. The resulting product contained 6.8 mol percent mercaptopropylsiloxane. 250 g. of this material was mixed with 247 g. of distilled water, 2.5 g. of sodium lauryl sufate and 4 g. of dodecyl benzene sulfonic acid. The resulting mixture was stirred for 1.5 hours at room temperature and mixed in an homogenizer for 3 seconds. At the end of this time, the emulsion was treated with 2 percent sodium hydroxide solution and then was neutralized with glacial acetic acid. The resulting emulsion contained 41 percent by weight siloxane and had a particle diameter in the range of 1 to 10 microns.

195 g. of distilled water, 0.0125 g. of $FeSO_4 \cdot 7H_2O$, 9.8 g. of the above silicone emulsion, 0.5 g. of $Na_4P_2O_7 \cdot 10H_2O$, 0.125 g. of alpha-D-glucose, 0.085 g. of cumene hydroperoxide and 0.12 g. of n-dodecyl mercaptan were mixed and stirred under a nitrogen purge at 65° C. 96 g. of purified styrene was then dripped into the emulsion over a period of 2 hours and the reaction allowed to continue overnight. The reaction had not been completed so an additional 0.125 g. of alpha-D-glucose and 0.085 g. of cumene hydroperoxide were added and the reaction continued for 5 hours at 90°-95° C. Unreacted monomeric styrene was steamed distilled from the emulsion and the emulsion was precipitated by addition to 2 percent calcium chloride solution. The plastic containing 4 percent by weight siloxane was washed, dried and mixed on a Brabender at 65 r.p.m. at 180° C. for 5 minutes. The resulting material was compression molded at 180° C. The Izod impact strength was 0.46 pounds per inch as compared with the blank of 0.28 pounds per inch.

That which is claimed is:

1. A thermoplastic vinylic polymer having improved impact strength made by the method which comprises polymerizing (1) a vinylic monomer selected from the group consisting of styrenic monomers, methyl methacrylate, mixtures of major amounts of styrenic monomers and minor amounts of monomers selected from the group consisting of acrylic monomers, alpha-methylstyrene, vinyl halide monomers, vinyl acetate, butadiene monomers and acrylonitrile monomers and mixtures of major amounts of methyl methacrylate and minor amounts of monomers selected from the group consisting of other acrylic monomers, styrenic monomers, butadiene monomers, vinyl halide monomers, vinyl acetate, alpha-methylstyrene, and acrylonitrile monomers, in an aqueous emulsion of (2) a copolymer of dimethylsiloxane, from 0.3 to 10 mol percent mercaptosiloxane of the unit formula $HSR'SiR_nO_{3-n/2}$ in which R' is a divalent or trivalent saturated aliphatic hydrocarbon radical of 1 to 18 carbon atoms, two valences of R' being attached to the same silicon atom when R' is trivalent, R is a monovalent hydrocarbon radical free of aliphatic unsaturation of 1 to 6 carbon atoms and $n$ is 0 to 2 and sufficient $R''SiO_{3/2}$ or $SiO_2$ units to give a percent volume swell of the copolymer of 500 to 1,600 percent in benzene, R'' being of the group HSR'— and R groups, in the presence of a free radical generator, whereby a thermoplastic matrix having dispersed therein particles of (2) is obtained, the proportions of (1) and (2) being from 1 to 40 percent by weight (2) based on the combined weights of (1) and (2).

2. The polymer according to claim 1 in which (1) is a copolymer of styrene and acrylonitrile and (2) is a copolymer of dimethylsiloxane and mercaptopropylsiloxane.

3. The polymer in accordance with claim 2 in which (1) is a copolymer of styrene and acrylonitrile and (2) is a copolymer of dimethylsiloxane, mercaptopropylmethylsiloxane and ethyl orthosilicate.

4. The polymer in accordance with claim 1 in which (1) is methyl methacrylate.

5. The polymer in accordance with claim 1 in which (1) is styrene.

6. The polymer of claim 1 in which (1) is a copolymer of styrene and acrylonitrile and (2) is present in amount of 10 to 30 percent by weight based on the combined weights of (1) and (2).

7. The polymer of claim 5 in which (2) is present in amount of from 1 to 5 weight percent based on the combined weights of (1) and (2).